Oct. 22, 1929.                G. FLINTERMANN                1,732,648
                                FLEXIBLE JOINT
                              Filed July 14, 1928           3 Sheets-Sheet 1
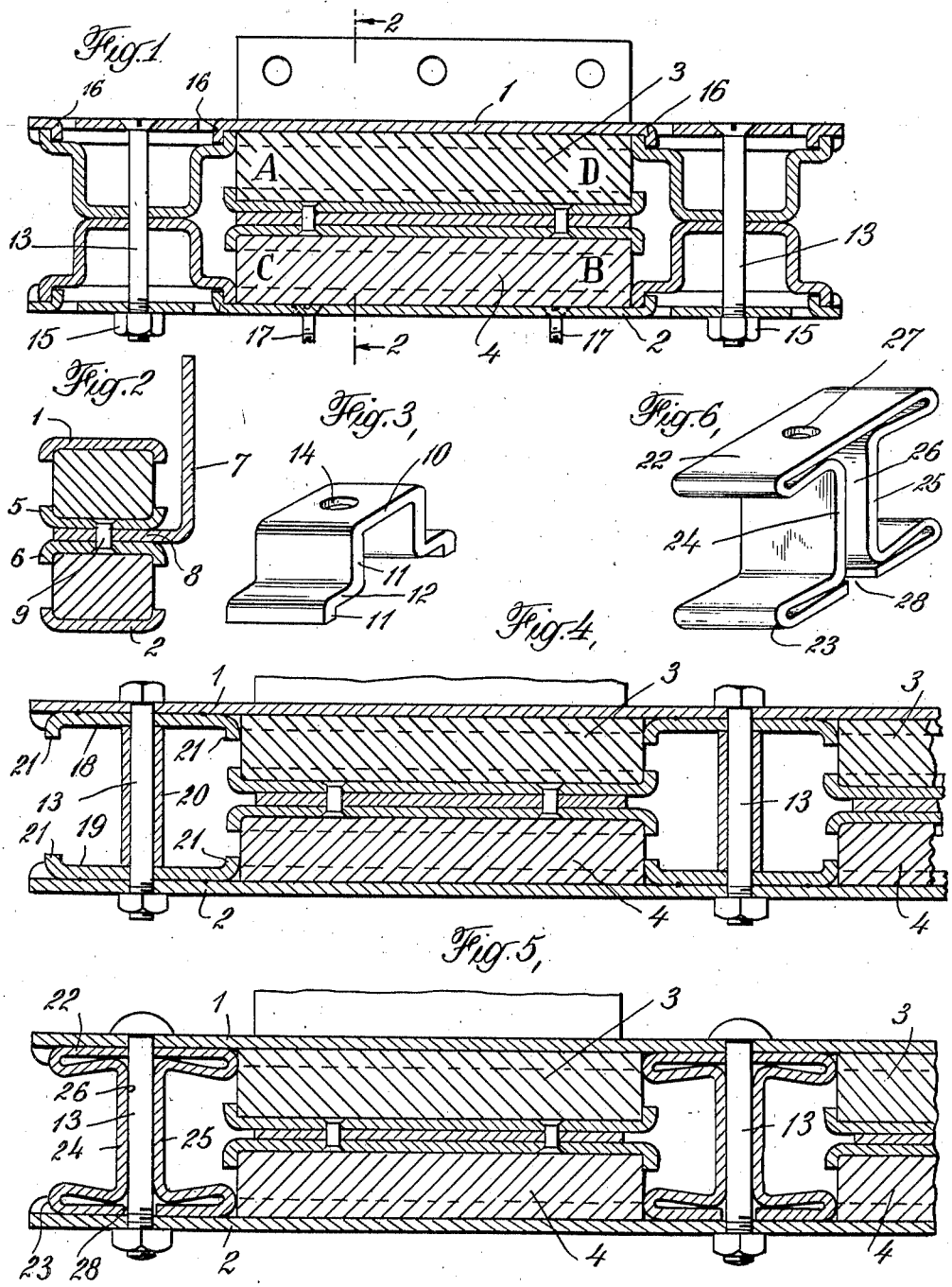

Oct. 22, 1929.　　　G. FLINTERMANN　　　1,732,648
FLEXIBLE JOINT
Filed July 14, 1928　　　3 Sheets-Sheet 2
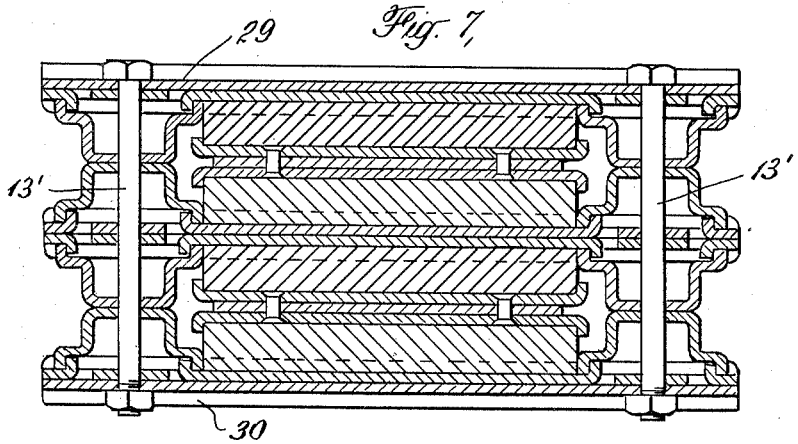
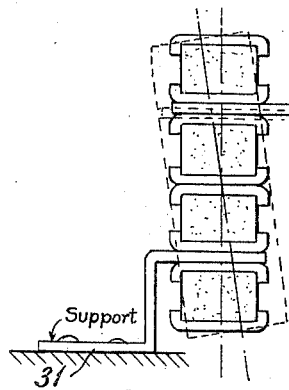
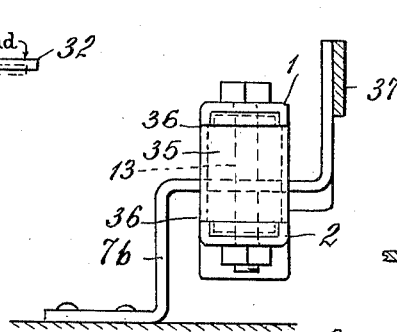
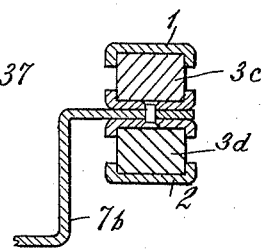
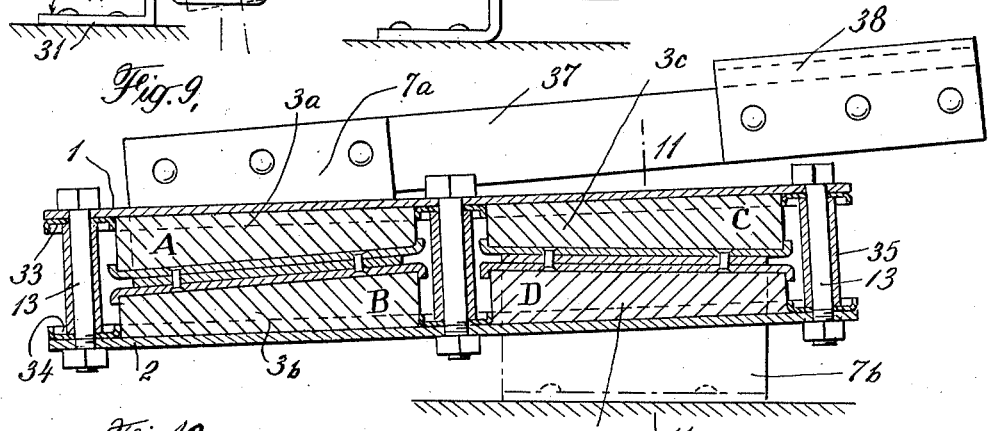
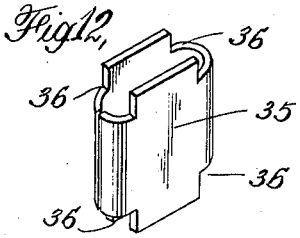

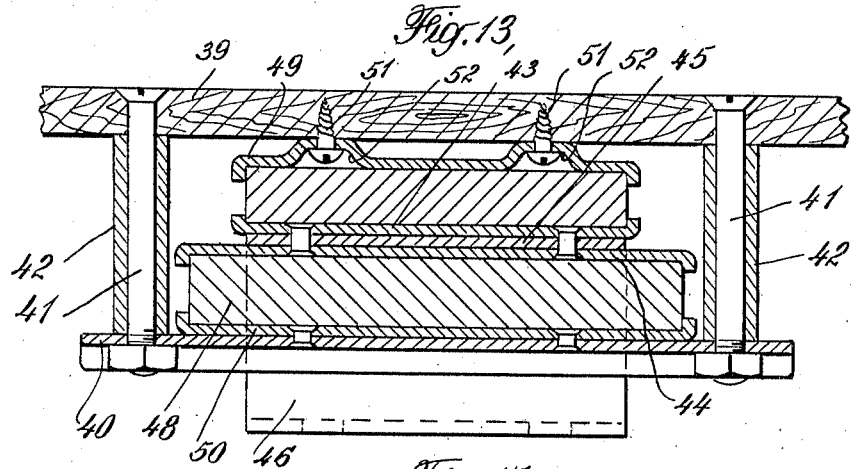
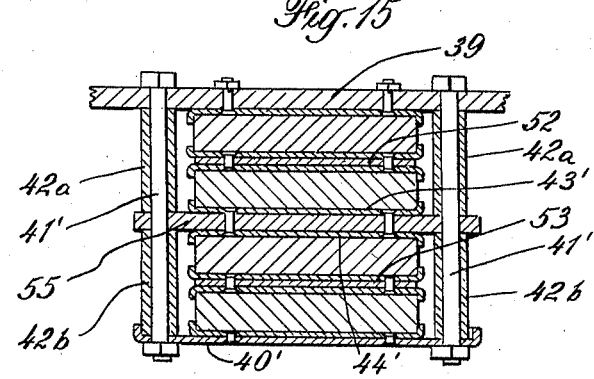
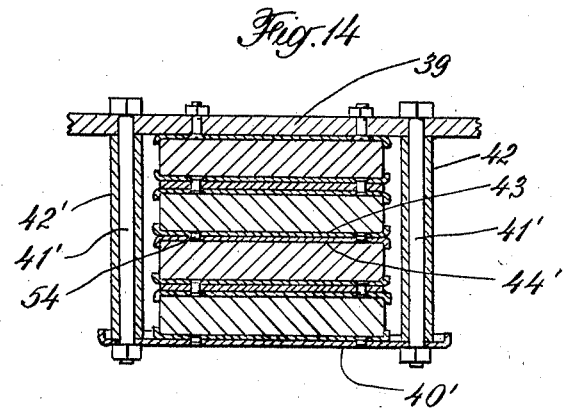

Patented Oct. 22, 1929

1,732,648

UNITED STATES PATENT OFFICE

GERHARD FLINTERMANN, OF WEST ORANGE, NEW JERSEY

FLEXIBLE JOINT

Application filed July 14, 1928. Serial No. 292,898.

This invention relates to flexible joints of the kind heretofore proposed by me in which there is an outer elongated housing, an inner elongated member, and elongated non-metallic resilient material interposed between the inner member and the walls of the housing such that angular changes between the longitudinal axes of the housing and the inner member are yieldingly resisted by the resilient material. The principal object of the invention is to provide a flexible joint of this general character which is so far simplified in construction as to make it thoroughly practical for commercial manufacture and to make it readily available for numerous uses.

A further object of the invention is to provide a flexible joint of the aforementioned character which may be assembled from structural units of simple formation such as metal stampings or pressings of extreme simplicity.

Another object of the invention is to provide a flexible joint structure in which the component parts are so made and so shaped as to enable a number of individual flexible joints to be readily and easily combined into a composite joint structure for uses similar to those hereinafter described.

The invention has certain other objects which will hereinafter appear.

In the drawings:

Fig. 1 is a longitudinal section of a flexible joint constructed in accordance with the invention;

Fig. 2 is a transverse section taken on the line 2—2 of Fig. 1;

Fig. 3 is a perspective detail view showing one of the spacing units employed at the ends of the casing;

Figs. 4 and 5 are longitudinal sections through modified forms of joints constructed in accordance with the invention;

Fig. 6 is a detail perspective view of the spacing unit employed in the form of device illustrated in Fig. 5;

Fig. 7 is a longitudinal section through a flexible joint structure formed by superposing two joints of the kind shown in Fig. 1;

Fig. 8 is an explanatory diagram illustrating one of the possible uses of the type of joint structure shown in Fig. 7;

Fig. 9 is a longitudinal section of a modified form of joint structure constructed in accordance with the invention;

Fig. 10 is an end elevation of the joint structure of Fig. 9 viewing it toward the left;

Fig. 11 is a transverse vertical section taken on the line 11—11 of Fig. 9;

Fig. 12 is a detail perspective view of the type of spacing unit which may be employed in the joint structure of Fig. 9; and Figs. 13 to 16 inclusive are longitudinal sections of further modified forms of flexible joints constructed in accordance with the invention.

Referring first to Figs. 1 to 3 inclusive, the flexible joint shown in these figures comprises oppositely disposed channel shaped plates or strips 1 and 2 which are considerably longer than they are wide. They are preferably made of pressed metal. They are positioned with their channels facing each other so as to confine between them a mass of non-metallic resilient material, such as rubber. The resilient material may be divided into two bodies, an upper strip or block 3 and a lower one 4. Interposed between the blocks of resilient material 3 and 4 is the inner structure of the joint which in the present instance comprises an upper elongated cup 5 which receives the lower portion of the upper block 3, and a lower elongated cup 6 which receives the upper portion of the block 4. A bracket such as shown at 7 has a portion 8 which extends between the cups 5 and 6 and may be riveted to them as shown at 9. The bracket 7 may be secured to one of the objects between which the joint is to be interposed. Obviously the member 7—8 may be a part of the object itself. Adjacent each end of the resilient material and interposed between the plates 1 and 2 there is a spacing structure made up of two units having the shape shown in Fig. 3. These units may be pressed from sheet metal and may have a web portion 10 and vertical walls 11 preferably provided with a horizontal offset 12. Two of these units are employed at each end of the joint to make up one complete spacer. They are positioned with the webs 10 together as shown in Fig. 1 and then a bolt 13 is passed through the plates 1 and 2 and through holes 14 in the spacer units. When the nuts 15 on the bolts are tightened the plates 1 and 2 will be clamped against the spacers and will confine the resilient material 3—4. The plates 1 and 2 are preferably provided with integral inwardly extending tongues or projections 16 which engage with the edge portions of the spacing units to assist in holding them in position. These tongues and the spacers are so positioned and spaced longitudinally of the joint that the spacers confine the resilient material 3—4 and prevent its bodily movement in a longitudinal direction. The outer housing or casing of the joint formed by the plates 1 and 2, the spacing structures between the ends of these plates and the bolts 13, may be attached to the other of the two objects between which the joint is to be interposed, in any suitable way, as for instance, by means of the bolts or screws shown at 17. If desired the bolts 13 may also be used for this purpose.

When the flexible joint is interposed between two objects such for instance as a seat and the floor, the seat will be capable of a limited vertical movement with respect to the floor and this movement will be yieldingly opposed by the resilient material 3—4. The seat will also be capable of a tilting movement with respect to the floor as the longitudinal axes of the inner member and the housing are capable of changing their angular relation and this change is yieldingly opposed by the resilient material 3—4. When such an angular change takes place between the longitudinal axes of the housing and inner member the mass of resilient material will be compressed either in the vicinity of the points marked A and B, or in the vicinity of the points marked C and D.

It will be observed that the entire joint is made up of elements or units of very simple formation which may be manufactured at small cost. The outer housing of the joint which confines the resilient material is formed simply by utilizing two strips which are substantially straight throughout their length and these strips are held spaced apart and in parallel relation throughout by the spacers. The spacers are of substantially block formation, that is, all of the outermost points lie in planes which define a geometrical figure of block shape. The spacers constitute the end walls of the housing and the inner member of the joint has an associated part which projects laterally from the resilient material.

The joints shown in Figs. 4 and 5 are constructed on the same principle. The main difference is in the use of spacers of a different type. In Fig. 4 the spacers are made up of units comprising small plates 18 and 19 separated by means of a sleeve 20. The bolt 13 which passes through the plates 1 and 2 of the casing also passes through the plates 18 and 19 and through the sleeve 20 thus binding all the parts together. The sleeve 20 preferably extends in a transverse direction the full width of the plates 1 and 2 in order to provide lateral stability. The plates 18 and 19 are preferably provided with short flanges 21 along at least two marginal edges and the spacer plates are so positioned that one flange of each plate lies against the adjacent end of the resilient material. The flanges 21 on the spacing plates which are in contact with the resilient material confine it in a longitudinal direction.

Figs. 4 and 5 both show a portion of another joint located to the right of the right hand spacing member. This is to indicate that the complete joint shown in each of these figures may be readily duplicated so that the several joints will be positioned end to end, as hereinafter more fully explained.

In Fig. 5 the spacing members may be made by forming a strip of sheet metal into the shape shown in Fig. 6 so that it has in general the shape of a section of an I beam. In this way the spacer may be made all in one piece instead of in two or more units as described above. When a strip of material is bent to the shape shown in Fig. 6 it will have an upper flange 22, a lower flange 23 and a vertical web portion formed by two adjacent portions 24 and 25 of the strip. The space 26 between these portions accommodates the clamping bolt 13. The upper flange 22 may be provided with a hole 27 to receive the bolt and the corresponding opening for the lower end of the bolt may be provided by leaving a space 28 between the extreme ends of the strip where they tend to meet at the mid point of the bottom flange.

In all of the joints so far described the resilient material is confined laterally by the side flanges on the plates 1 and 2 and by the side flanges on the cup members of the inner structure.

Due to the regularity of the general outline of the joint, that is, due to the fact that the upper and lower plates are substantially straight, the joint lends itself well for uses where it is desired to combine several joints into one composite joint structure. This may be done, for instance, by superposing two or more of the joints in the manner shown in Fig. 7. By superposing is meant positioning the joints together with their longitudinal axes substantially parallel regardless of what position the joints and final composite joint structure may be in. When two of the joints are superposed in the manner shown in Fig. 7 they may be secured together in any suitable manner, but for the sake of simplicity the individual bolts 13 are preferably replaced by longer bolts 13' which will extend through the entire joint structure and not only clamp together the parts of each joint, but will also clamp together the two joints into one unitary structure. This can only be done, of course, when the parts of one joint come directly in line with the parts of the other joint so that the bolt holes in the outside plates and the spacing units will all be in alignment. In some instances it may be desirable to attach the joints together in such a way that one will be offset with respect to the other, in which case they may be secured together in any suitable way. Fig. 7 shows an additional channel strip 29 located above the joint structure and a similar channel strip 30 located below it and as the bolts 13' are shown as passing through these additional channel strips, the two joints are really clamped between them. These additional channel strips 29 and 30 are simply intended to reinforce the structure, and they may be omitted if desired. Similar reinforcing members may be added to one or both sides of any of the joints hereinbefore described.

The joint structure shown in Fig. 7 may have a number of different uses. The diagram of Fig. 8 is intended to illustrate one manner in which it may be used. For instance, the inner member of the lower joint may constitute a support or be connected to a support as represented at 31 and the inner member of the other joint may be subjected to the action of the load as represented at 32. Under these circumstances the resilient material will be compressed at various joints depending upon the direction of the load and whether or not the load tends to change the angularity between the axes of the inner members and the housing. Under some circumstances the parts may be deflected toward some such position as shown by the dotted lines in Fig. 8 because the entire outer casing or housing of the joint structure is unattached to the inner members except through the intermediary of the resilient material and therefore practically floats and may be deflected by the load.

Instead of superposing the joints, they may, of course, be placed side by side and may be fastened together in any suitable way. Moreover, they may be placed end to end. One way in which they may be placed end to end is illustrated in Figs. 4 and 5 from which it will be seen that the resilient material and the inner structure is duplicated to the right hand spacer and the plates 1 and 2 are made long enough to house the second mass of resilient material. The extreme right hand end of the joint structure formed in this manner would be the same as the left hand end, that is, the joint would have a spacing structure between the extremities of the plates 1 and 2 like that shown in Fig. 4, or like that shown in Fig. 5, depending on which type of joint it happens to be.

Fig. 9 shows a modified type of joint structure in which there are two joints placed end to end as in Figs. 4 and 5 and this figure also illustrates one of the possible uses to which such a joint structure may be placed. In Fig. 9 the two plates or strips 1 and 2 house two pairs of resilient blocks, one pair being shown at $3^a$—$3^b$ and the other pair at $3^c$—$3^d$. The plates 1 and 2 are spaced apart at a point between the two pairs of resilient blocks and at the ends of the plates by means of spacers which may be of any of the types hereinbefore described or any type similar thereto. In Fig. 9 the spacers differ in construction from any of those hereinbefore described. They are preferably formed of a pair of plates 33 and 34 corresponding to and performing the same function as plates 18 and 19 of Fig. 4. These plates are held apart by an intervening member 35 having the shape shown in Fig. 12. It may be formed of a strip of sheet metal bent to the form of a flattened cylinder with the corners cut out as shown at 36 to accommodate the side flanges of the plates 1 and 2. The members 35 are positioned so that the long axis of the flattened cylinder extends crosswise of the joint as shown at Fig. 10, and the bolt 13 extends through its central opening. Each spacing structure, comprising the plates 33 and 34 and the member 35, is clamped between the plates 1 and 2 by the bolt 13 in the same manner as the corresponding spacing structure shown in Fig. 4, and when they are so clamped they perform the same function as the corresponding spacing structures shown in Fig. 4. To illustrate how the type of joint structure shown in Fig. 9 may be used, part $7^a$, connected with the inner structure of one joint is shown as secured to a lever 37 and the corresponding portion $7^b$ of the other joint is shown as secured to a support such as a floor. The load may be applied to the end of the lever 37. For instance, the bracket 38 shown at the end of the lever may be secured to a seat. In practice there would probably be several joint structures of the kind shown in Fig. 9 interposed between the seat and the floor. For instance, there might be one at one side of the seat and one at the other. When the joint structure is used in this way the load acting through the lever 37 causes a tilting of the left hand inner structure with respect to the outer housing and therefore the blocks of resilient material $3^a$—$3^b$ will be compressed in the vicinity of the points marked A, B. The blocks of resilient material are represented as being tapered. This has the effect of causing the shocks to be more gradually absorbed as fully set forth in my copending application Serial No. 187,156, filed April 28, 1927. The action just described will also result in an upward movement of the left end of the housing and this will result in a compression of the resilient blocks $3^c$—$3^d$ at the points marked C and D. The blocks $3^c$—$3^d$ of resilient material are shown tapered for the same purpose as the blocks 3ᵃ and 3ᵇ. The exact character of the movement obtained at the end of lever 37 where the load is supported will depend upon a number of factors, such as the length of the lever 37, the length of the housing of the joint, the shape of the blocks of resilient material, their length and possibly other things. The joint structure shown in Fig. 9 may be used in many other different ways. For instance, the part 7ᵃ may be secured to the floor or other support in addition to the part 7ᵇ and the load may be supported on the outer casing of the joint structure. The exact action obtained by the joint and the resiliency furnished by it will depend upon the way in which the joint is used to interconnect the two objects.

Figs. 13, 14 and 15 show joints which are different in construction from those heretofore described but which come within the broader aspects of the invention. In Fig. 13 the outer housing of the joint structure, which corresponds with the outside plates and the spacing structures of the joints hereinbefore described, comprises a plate, platform or other part 39—which might be the bottom of a seat, for instance—a channel shaped strip 40 bolted to the part 39 by bolts 41, and spacers 42 for spacing the strip 40 from the part 39. These spacers may be of any suitable construction but are preferably at least as wide as the resilient material of the joint. The inner structure of the joint is constructed substantially the same way as the inner structure of the joints heretofore described, that is, it comprises a pair of elongated cups 43 and 44 positioned with their bottom webs toward each other and secured to an interposed portion 45 of a bracket 46 which is adapted to be attached to one of the objects, for instance, the floor. A block of resilient material 47 is received by the cup 43 at one side of the inner structure and a similar block of resilient material 48 is received by the cup 44 at the other side of the inner structure. In the case of Fig. 13 these blocks of resilient material are represented as being of different lengths. This is simply to illustrate that such a feature might be used, for instance, to vary the action of the joint. Likewise, they might be made of different densities or different thicknesses depending upon the type of action that is desired. The upper portion of the block 47 of resilient material is received by a cup 49 and the lower part of the block of resilient material 48 is received by corresponding cup 50. These cups are secured respectively to the outer members of the structure which in this case is the bottom 39 of the seat and the channel shaped strip 40. The upper cup 49 may be secured to the bottom 39 of the seat by means of wood screws 51 and the heads of these screws may be received in depressions 52 formed in the bottom web of the cup 49. The lower member 40 being metal may be riveted to the cup member 50 as shown. When the joint structure just described is associated with a seat in the manner above indicated the seat will be capable of a vertical movement with respect to the support and this movement will be yieldingly resisted by the resilient material. When the seat tilts with respect to the support the inner structure of the joint will remain substantially stationary while the outer structure comprising the part 39, strip 40, spacers, bolts and outer cups 49 and 50 will shift so that its longitudinal axis will change its angularity with the longitudinal axis of the stationary inner member of the joint.

Preferably there would be duplicated at the other end of the seat 39 another joint of the kind shown in Fig. 13, that is, all of the parts shown in Fig. 13 attached to or suspended from the seat bottom 39 would be duplicated and employed for supporting the opposite end of the seat.

It will be seen that the joint illustrated in Fig. 13 is similar in construction to the joints hereinbefore described, in that it comprises at least two separately formed and spaced plates which are substantially straight in the longitudinal direction of the joint and these plates are spaced apart and held parallel by spacers which form with the plates an external housing structure for the resilient material. The resilient material, as in the other joints hereinbefore described, comprises two blocks of rubber or the like interposed between the two outside plates, and interposed between the two blocks of resilient material is the inner member some associated part of which projects laterally from the resilient material. The blocks of resilient material may be as wide in a lateral direction as circumstances may require. Preferably they are about as wide with respect to their length as indicated in the other figures.

The joint structure shown in Fig. 14 is similar in construction to that shown in Fig. 13 except that two joints are superposed and clamped together between the outer plates 39 and 40′. In this respect the joint structure of Fig. 14 is similar to the joint structure of Fig. 7. The two cups 43′ and 44′ which adjoin each other due to the superposing of the two joints may be riveted or otherwise secured directly together as represented at 54. In this type of joint structure the action of one joint may affect the action of the other inasmuch as the two cups 43′ and 44′ are secured directly together and are independent of and really float within the outer housing structure. In Fig. 15 there is interposed between the cups 43′ and 44′ an intervening member 55 which forms a part of the housing structure. The member 55 may be spaced from the outer plates 39 and 40′ by means of spacers 42ᵃ and 42ᵇ and the entire outer structure including the three plates 39, 55 and 40', together with the spacers 42ᵃ and 42ᵇ, may be clamped together by bolts 41'. In this type of joint structure the joints operate independently of each other because they are supported by the member 55 forming a part of the housing structure.

In the joint structures shown in Figs. 14 and 15 the outer housing structure may float as in the diagram of Fig. 8 or it may be attached to one of the two objects between which the joint is to be interposed depending upon the use to which the joint structure is placed. If desired, the plate 39 may constitute a part of one of the objects itself. For instance, it might be the bottom of a seat. Likewise, the lower plate not only of Figs. 14 and 15, but also of Fig. 13 might be connected to or be a part of one of the objects between which the joint is to be interposed.

I claim:

1. A flexible joint comprising a pair of separately formed spaced plates which are substantially straight in a direction longitudinally of the joint, and a spacing structure interposed between said plates at each end of the joint, means for clamping said plates against the spacing structures, an inner member interposed between said plates, and a mass of non-metallic resilient material between each plate and the inner member, said inner member having an associated portion projecting laterally from the resilient material whereby it may be attached to one of the two objects between which the joint is to be interposed.

2. A flexible joint in accordance with claim 1 in which said plates have greater length than width and in which the inner member is elongated in the direction of the length of the plates.

3. A flexible joint comprising a pair of separately formed spaced plates which are substantially straight in a direction longitudinally of the joint and which have greater length than width, and a spacing structure interposed between said plates at each end of the joint, each of said spacing structures being substantially the same width as the plates, means for clamping said plates against the spacing structures, an inner member interposed between said plates, said inner member being elongated in the direction of the length of the plates, and a mass of non-metallic resilient material between each plate and the inner member, said inner member having an associated portion projecting laterally from the resilient material whereby it may be attached to one of the two objects between which the joint is to be interposed.

4. A flexible joint in accordance with claim 1 in which the plates are channel shaped in cross-section with the channels of the two plates facing each other.

5. A flexible joint in accordance with claim 1 in which each spacing structure comprises at least one sheet metal part formed to a shape such that all of the outermost points of the spacing structure lie in planes which for a geometrical body of substantially block shape.

6. A flexible joint in accordance with claim 1 in which each spacing structure comprises at least one sheet metal part formed to a shape such that all of the outermost points of the spacing structure lie in planes which form a geometrical body of substantially block shape, and in which the plates have greater length than width.

7. A flexible joint comprising a pair of separately formed metallic strips which are substantially straight in a direction longitudinally of the joint and which are substantially channel shaped in cross-section, and a spacing structure interposed between said strips at each end of the joint and formed of at least one strip of sheet metal, means for clamping said straight strips against the spacing structures, an inner member interposed between said straight strips, and a mass of non-metallic resilient material between each straight strip and the inner member, said inner member having an associated portion projecting laterally from the resilient material whereby it may be attached to one of the two objects between which the joint is to be interposed.

8. A flexible joint comprising a pair of plates which are substantially straight in a direction longitudinally of the joint, a spacing structure interposed between said plates at each end of the joint, said spacing structures maintaining said plates in spaced relation and substantially parallel throughout their length, means for clamping said plates against the spacing structures, an inner member interposed between said plates, and a mass of non-metallic resilient material between each plate and the inner member, said inner member having an associated portion projecting laterally from the resilient material whereby it may be attached to one of the two objects between which the joint is to be interposed.

9. A flexible joint comprising a pair of separately formed strips having greater length than width and which are substantially straight throughout their length, a spacing structure interposed between said strips at each end of the joint, said spacing structures maintaining the strips in spaced relation and substantially parallel throughout their length, an inner member which is elongated in the direction of the length of said strips and which is interposed between them, and a mass of non-metallic resilient material between each strip and the inner member, said inner member having an associated portion projecting laterally from the resilient material whereby it may be attached to one of the two objects between which the joint is to be interposed.

10. A flexible joint comprising at least one pair of plates which are substantially straight in a direction longitudinally of the joint, spacing structures maintaining said plates in spaced and parallel relation throughout their length, a plurality of sets of resilient blocks confined between said plates and an inner member interposed between the two resilient blocks of each set, each of said inner members having an associated portion projecting laterally from the resilient material whereby it may be attached to an object in connection with which the joint is to be used.

In testimony whereof I affix my signature.

GERHARD FLINTERMANN.